3,355,905
AIR CONDITIONING SYSTEM WITH MEANS FOR
PREVENTING THE FORMATION OF ICE
Edwin D. Berhold, Northridge, and Robert C. Kinsell,
Los Angeles, Calif., assignors to The Garrett Corporation, Los Angeles, Calif., a corporation of California
Filed Aug. 19, 1966, Ser. No. 573,713
9 Claims. (Cl. 62—156)

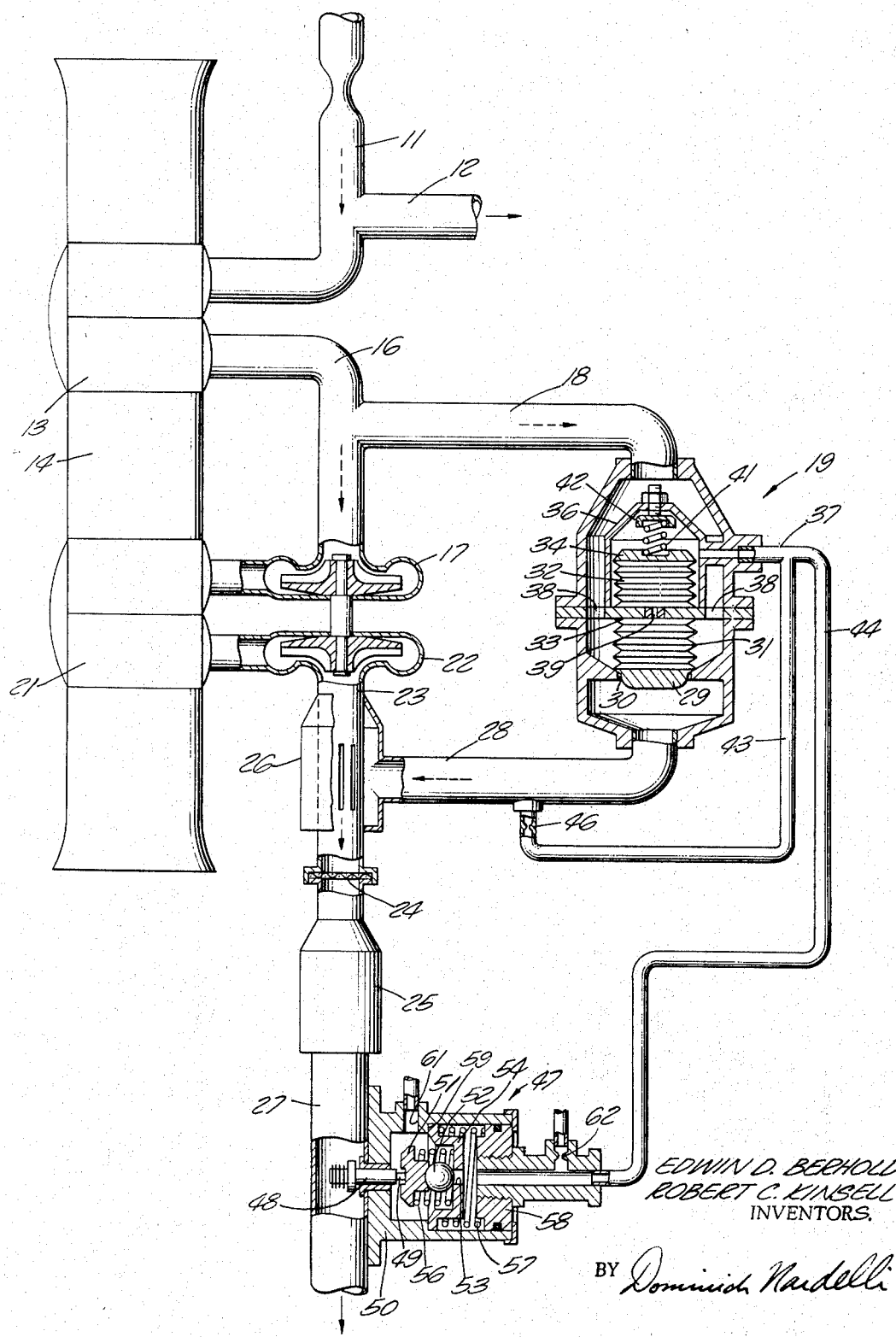

This invention relates to air conditioning systems and, more particularly, to improved means in an aircraft air conditioning system for preventing the formation of ice without limiting the cooling capacity of the system.

Up to now, air conditioning systems, which have been used on aircrafts, used one or the other two methods to prevent the formation of ice. One method maintains the dry bulb temperature of the refrigerated air above a given minimum temperature, i.e., whenever the dry bulb temperature tended to drop below, for example, 40° F., warm air was added to raise the temperature of the refrigerated air. This prevented the formation of ice but limited the cooling capacity of the system since on hot dry days the refrigerated air could be at much lower temperatures and still not have ice forming in the system. The other method sensed the pressure drop across a water separator unit in the system, i.e., when the pressure drop across the water separator unit increased (indicating that ice was forming) warm air was added to the refrigerated air to raise the temperature above the dew point causing the ice to melt. Although this latter method allowed full utilization of the refrigeration capabilities of the system, the cabin pressure of the aircraft fluctuated greatly because of the inherent inertia within the system. In addition, during transient moisture conditions of the incoming air, such as an aircraft flying through a cloud, a sudden drop in the dew point caused the water in the water separator to freeze even though an ice screen has been incorporated in the system.

Therefore an object of this invention is to provide an improved means for preventing the formation of ice in an air conditioning system.

Another object of this invention is to provide an air conditioning system which prevents great fluctuations in the air flow rate and, in turn, in cabin pressure.

Another object of this invention is to provide an air conditioning system which provides for maximum air flow during the time an aircraft engine is idling for let down or landing.

These and other objects and features and advantages of the present invention will become more apparent from a review of the following specification and claims when taken in conjunction with the drawing wherein the sole figure is a diagrammatic sketch of the air conditioning system with the novel means.

Referring to the drawings, there is shown a main air duct 11 which is supplied with compressed air, for example, bleed air from a jet engine. The duct 11 has a T-branch 12 for drawing off warm air as may be needed in other parts of the aircraft. The compressed air that is to be used for air conditioning is conducted to a heat exchanger 13 where the compressed air in the duct 11 is cooled by ambient air passing through a cowling 14. The compressed air leaves the heat exchanger 13 through a duct 16 to be compressed by a compressor 17. Duct 16 has a branch 18 which conducts part of the compressed air from the heat exchanger 13 to a novel valve 19 which will be described more fully hereinafter and which is a part of the improved means for preventing the information of ice in the system.

After the compressed air is further compressed by compressor 17, the air is cooled in a heat exchanger 21 also by the ambient air within cowling 14. The cooled compressed air from heat exchanger 21 is expanded in a turbine 22 to the cabin pressure of the aircraft. The air in passing through the turbine gives up energy and becomes cold. The energy is used to power compressor 17. The cold air leaves turbine 22 through an exit duct 23, then passes through an icing screen 24, a water separator 25 and a duct 27 into the cabin. Between the turbine 22 and screen 24, a suitable T fitting 16 is disposed for efficiently mixing the air in a duct 28 with the air in duct 23. The duct 28 communicates with the valve 19.

The valve 19 is a poppet type valve that includes means for minimizing any potential instability problems in the system. The valve 19 has a poppet 29 which seats on a valve 30 so that duct 18 is closed off from duct 28 when the poppet 29 is seated. The active elements of the valves include a pair of bellows 31 and 32 made of, for example, metal. Bellows 31 connects the poppet 29 to a support plate 33, and bellows 32 is fixed to the other side of the support plate 33 opposite bellows 31. The bellows 32 is closed at the other end with a plate 34 and is disposed within a sensing chamber formed by a cup-member 36, sealed to the support plate 33 and communicating with a tube 37. The support plate 33 has a plurality of ports 38 formed therein and located between the cup-member 36 and the casing for the valve 19, so that a passageway is formed between ducts 18 and 28 when the poppet 29 is not seated on the valve seat 30. The support plate 33 also has a centrally located orifice 39 formed therein which causes the interiors of both bellows 31 and 32 to communicate with each other. The bellows 31 and 32 are preferably filled with liquid that provides sufficient damping for the poppet 29 since the liquid has to flow through the orifice 39 whenever the poppet 29 moves. A spring 41 with an adjustment means 42 is provided to adjust the closing force on the poppet 29.

Tube 37 branches into two tubes 43 and 44. Tube 43 communicates with duct 28 through an orifice 46 for reasons that will be explained hereinafter. Tube 44 communicates with a temperature sensor 47 which senses the temperature of the air in duct 27 just before the air enters the aircraft cabin. The sensor 47 includes a cup shape casing 50 with a temperature sensing element 48 protruding through the closed end thereof into duct 27 so that the temperature of the air within duct 27 is sensed by the element 48. The sensing element 48 includes, for example, a rod 49 which has a relatively large heat coefficient of expansion so that the rod 49 elongates when the air temperature rises and contracts when the air temperature falls. On the end of the rod 49 and disposed within the casing 50 is a rod cap 51 which holds a steel ball 52 against a port 53 formed in a piston 54. A compression spring 56 is provided between the piston 54 and the rod cap 51 while another spring 57 is provided between the piston 54 and an end plate 58 to which tube 44 is connected. When the temperature of the air in duct 27 falls below a given value, for example, 40°, the spring 57 causes the piston 54 to be urged against a shoulder 59 formed on the casing 50. In addition, with the air temperature below 40° F., the spring 56 causes the rod cap 51 to move away from the steel ball 52 opening the port 53. When the temperature of the air reaches, for example, 40° F. the rod 49 elongates sufficiently to cause the ball 52 to contact the port 53 closing off the port. If the air temperature still rises the rod 49 is elongated further and this expansion is taken up by spring 57 as the piston 54 is forced to slide away from the shoulder 59. The chamber formed by the piston 54 and the casing 50 is suitably vented to ambient pressure through a port 61 while the pressure in the tube 44 is vented to ambient pressure through an orifice 62.

The system operates as follows: first, when the aircraft is on the ground ready for take off, the pressure in the cabin and duct 27 is at ambient pressure, and if the day is warm the temperature in the cabin is above 40° F. and, therefore, port 53 is closed. Compressed bleed air from the engine is fed into duct 11 where the air is cooled in heat exchanger 13, further compressed by compressor 17, cooled again in heat exchanger 21 to almost ambient temperature. The compressed air, cooled to substantially ambient temperature, expands in turbine 26 to ambient pressure. Since the pressure in duct 28 and the pressure in the chamber enclosed by cup-member 36 of valve 19 are both at ambient pressure the valve 19 is closed, and only refrigerated air passes through duct 27 into the cabin. If ice crystals are formed in the cool air exiting turbine 22, the crystals are collected by a screen 24 causing the pressure in duct 28 to build up. Thus the temperature of the air leaving the turbine 22 rises. Now, since there is ice present, the temperature of the air in duct 27 is below 40° F. and port 53 is open and tube 44 is fully vented to ambient pressure. The valve 19 does not open until sufficient ice is collected by the screen 22 to cause the pressure in duct 28 to build up and then to overcome the force of the spring 41. This causes poppet 29 to move away from the valve seat 30. Thus, as more ice crystals collect on the screen, the pressure in duct 28 is raised until the force in spring 41 is overcome. Thus, the poppet 29 tends to move away from the seat 30, but the liquid within bellows 31 is being forced through orifice 39 into bellows 32 causing the poppet 29 to move slowly and in direct response to the pressure in duct 28. The warm high pressure air in duct 18 passes through valve 19 bypassing the compressor 17 and turbine 22 into duct 23 causing the ice crystals on the screen 24 to melt. Thus full refrigeration is achieved since the system is operating to provide dew point temperatures in duct 27. The by-pass valve 19 allows the quantity of air entering the cabin of the aircraft to remain substantially constant, especially on humid days when excessive ice could build up on the screen 24. Thus, at sea level, if the screen pressure drop does not exceed, for example, 3 inches of mercury, the anti-icing screen 24 controls the dew point temperature by back-pressuring the turbine 22 and causing the air temperature exiting the turbine 22 to rise. Then, if the screen pressure drop exceeds, for example, 3 inches of mercury, further back pressure of the turbine 22 greatly decreases the flow of air, so that the dew point temperature control is obtained by the relatively large back-turbine-pressure that causes the valve 19 to open.

When the aircraft is flying and when the difference between cabin or duct 27 pressure and ambient pressure is more than 10 inches of mercury, the by-pass valve 19 is modulated by the temperature sensor 47 to maintain the air temperature in duct 27 at 40° F. For example, on a cold day with the ambient temperature of −15° F. at 10,000 ft. altitude, the air leaving heat exchanger 13 is about 11° F. and could contain moisture and the moisture content would be no more than 4.5 grams per pound (the amount of moisture in saturated air at 10,000 ft.). Thus, the air temperature in duct 27 would be well below 40° F., and the pressure within tube 44 and cup-member 36 will be ambient or 10,000 ft. The pressure in duct 28 would be at sea level since the cabin pressure is at sea level causing the valve 19 to open to cause 11° F. air to by-pass the compressor 17 and turbine 22. Thus, maximum flow of air is obtained. No ice crystals would form since the by-pass air is at 11° F. and the dew point of sea level air with 4.5 grams of moisture per point is −7° F. On warmer days the air leaving heat exchanger 13 could be more than 40° F., and therefore the sensor 47 closes the port 53 so that the pressure in the tube 44 builds up to close the valve 19, and allow more cool air from the turbine 22 into the duct 27. The pressure builds up in tube 44 since tube 43 communicates with duct 28 through an orifice 46. The high pressure air in duct 28 bleeds through the orifice 46. With the port 53 closed, the orifice 62, although it lets the air escape from tube 44, causes the air to escape at a slower rate than the rate at which the air enters through orifice 46 causing the pressure in tube 44 to build up. In turn, the valve 19 is closed.

If the cabin pressure, in an aircraft flying at 10,000 ft., is between the 10,000-ft. level and sea level or if the difference between cabin and ambient pressure is less than 10 inches of mercury, the valve could be anywhere from a full open to a full closed position. If, sufficient ice is collected on the screen 24 to increase the pressure in duct 28, the valve 19 opens more to allow more warm air into the cabin to prevent the formation of ice. However, if the ambient air is relatively warm, air temperature in duct 27 tends to rise above 40° F. The port 53 in sensor 47 is closed causing the pressure in tube 44 to increase, if the cabin pressure is more than ambient, and in turn, the valve 19 is closed to allow more cool air from the turbine to enter duct 27.

With the present disclosure in view, modification of the invention will appear to those skilled in the art. Accordingly, the invention is not limited to the exact details of the illustrated preferred embodiment but includes all such modifications and variations coming within the scope of the invention as defined in the claims.

What is claimed is:

1. An air conditioning system comprising:
   a first duct carrying a stream of relatively warm air,
   refrigeration means for receiving said warm air and cooling the air to a lower temperature,
   a second duct for receiving the cool air from said refrigeration means,
   a member disposed in said second duct adopted to accumulate any ice that may be formed in the cool air and producing a pressure drop across said member when ice is accumulated,
   duct by-passing means including a valve connected between said first duct and said second duct for by-passing said relatively warm air from said first duct into said second duct upstream of said member when said valve is open,
   a temperature sensor disposed within said second duct downstream of said member for sensing the temperature of the air, and
   control means responsive to said sensor and the pressure drop across said member for opening and closing said valve to provide a maximum flow of cool air through said member.

2. The air conditioning system of claim 1 wherein:
   said valve is a poppet valve which opens when there is an increase in the pressure of the air in said second duct upstream of said member.

3. The air conditioning system of claim 2 wherein:
   said poppet valve has a chamber disposed within the valve, and communicating means for communicating the interior of the chamber with ambient pressure so that the relative pressure differential between ambient and the pressure within said second duct determines when said valve is to open.

4. The air conditioning system of claim 2 wherein:
   said poppet valve includes a casing having a first part communicating with said first duct and having a second part communicating with said second duct,
   a valve seat disposed within said casing and between said parts,
   a poppet member disposed between said seat and said first part to seal against said seat,
   a chamber disposed in fixed position within said casing,
   a bellows fixed to said casing and said poppet member, and
   means for communicating the chamber enclosure with ambient pressure.

5. The air conditioning system of claim 3 wherein:
   said communicating means includes a tube communicating at one end with said chamber and coupled at the other end to said temperature sensor, said temperature sensor includes a ball means for closing the other end of said tube to ambient temperature, and includes means for moving said ball means against said other end of the tube when the air temperature in said second duct is above a given value and for moving said ball means away from said tube when the air temperature in said second duct is below the given value.

6. The air conditioning system of claim 5 wherein:

said communicating means include another tube communicating at one end with said chamber and communicating at the other end with said second duct upstream of said member for feeding air from said second duct to said chamber, an orifice means communicating with said chamber for bleeding air from said chamber at a slower rate than the rate which the air flows from said second duct to said chamber so that a pressure builds up in said chamber when said ball is against said other end of the tube to a value which is less than the pressure in said second duct and more than the ambient pressure.

7. The air conditioning system of claim 4 wherein:

said communicating means includes a tube communicating at one end with said chamber and coupled at the other end to said temperature sensor, said temperature sensor includes a ball means for closing the other end of said tube to ambient temperature, and includes means for moving said ball means against said other end of the tube when the air temperature in said second duct is above a given value and for moving said ball means away from said tube when the air temperature in said second duct is below the given value.

8. The air conditioning system of claim 7 wherein:

said communicating means include another tube communicating at one end with said chamber and communicating at the other end with said second duct upstream of said member for feeding air from said second duct to said chamber, an orifice means communicating with said chamber for bleeding air from said chamber at a slower rate than the rate which the air flows from said second duct to said chamber so that a pressure builds up in said chamber when said ball is against said other end of the tube to a value which is less than the pressure in said second duct and more than the ambient pressure.

9. The air conditioning system of claim 2 wherein:

said poppet valve includes an enclosure with a plate member dividing the enclosure in two parts, a cup-shaped member disposed in one part of said enclosure and sealed by its rim to said plate member forming a compartment, said member having at least one hole disposed between said cup-shaped member and the wall of the enclosure, a valve seat formed in the other part of said enclosure, a poppet disposed between said seat and said plate member, a first bellows fixed at one end to said poppet and at the other end to said plate member, a second bellows closed at one end and fixed to said plate member opposite said first bellows, said second bellows being disposed in said compartment formed by said cup-shaped member, and said plate member having an orifice communicating the interior of said first bellows to the interior of said second bellows so that any fluid with both bellows has to pass through said orifice when said poppet moves relative to said seat.

References Cited

UNITED STATES PATENTS

| | | | |
|---|---|---|---|
| 2,628,481 | 2/1953 | Scofield | 62—171 |
| 2,809,714 | 10/1957 | Sims | 62—402 X |
| 2,829,505 | 4/1958 | Oates | 62—172 X |
| 2,867,989 | 1/1959 | McGuff | 62—150 |
| 2,943,460 | 7/1960 | Brown | 62—150 |
| 2,992,542 | 7/1961 | Arthur | 62—172 |
| 3,012,413 | 12/1961 | Anderson | 62—150 |
| 3,083,546 | 4/1963 | Turek | 62—150 |

WILLIAM J. WYE, *Primary Examiner.*